Jan. 2, 1968 T. E. ELBERT 3,360,996
GYROSCOPE ASSEMBLY
Filed May 20, 1963
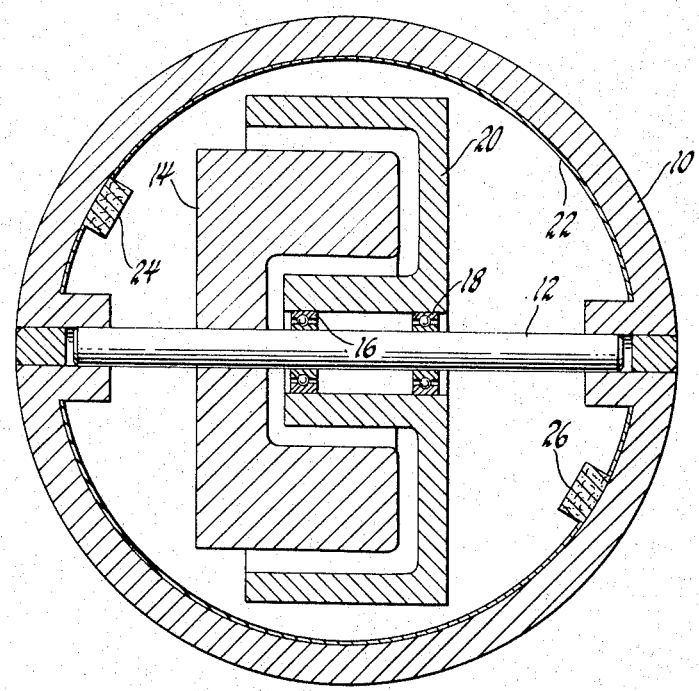
INVENTOR.
Thomas E. Elbert
BY
R. J. Wallace
ATTORNEY

United States Patent Office 3,360,996
Patented Jan. 2, 1968

3,360,996
GYROSCOPE ASSEMBLY
Thomas E. Elbert, Milwaukee, Wis., assignor to General Motors Corporation, Detroit, Mich., a corporation of Delaware
Filed May 20, 1963, Ser. No. 281,496
5 Claims. (Cl. 74—5)

This invention relates to gyroscopes and more particularly to a process and apparatus useful in prolonging the life of gyroscopes used in inertial guidance systems.

As pointed out in United States patent application Ser. No. 290,270, now Patent No. 3,326,053, entitled, "A Process and Apparatus for Improved Gyroscope Operation," which was filed simultaneously herewith and which is assigned to the assignee of the present invnetion, it is extremely important to operate a precision bearing assembly, such as a gyroscope rolling contact bearing assembly, in an extremely low oxygen atmosphere. This atmosphere must not only be just extremely low in oxygen, but the oxygen concentration in a normal pressure atmosphere must be maintained below about 0.03 part per million. Atmospheres having a higher oxygen pressure induce changes in gyroscope bearing operation which, in turn, induce changes in gyroscope performance. Hence, changes in gyroscope stability result. Obviously gyroscopes should be stable in operation. Accordingly, in precision bearing assemblies, such as those used in gyroscopes for inertial guidance systems, it is of extreme importance that the bearing assembly be run in an atmosphere having a low oxygen level.

In my United States patent application Ser. No. 281,-403, now Patent No. 3,319,473, entitled, "Gyroscope Assembly," which was also filed simultaneously herewith and which is assigned to the assignee of the present invention, I emphasize the importance of meticulously and continuously maintaining the oxygen level in a given atmosphere quantum, preferably relatively small, at the described extremely low value. For long durations of gyroscope operation, and particularly in instances where the gyroscope assembly is contained within a sealed enclosure for long periods of time before use, means must be provided to maintain an atmosphere at its initially prepared low level of oxygen. I describe means to be used within the sealed enclosure to insure that the oxygen level is maintained in the initial safe region.

The present invention involves a specific means for maintaining the oxygen at a safe level in a gyroscope float atmosphere. It is, therefore, an object of the present invention to provide both a gyroscope float assembly and a method for operating a gyroscope in a sealed float assembly.

Other objects, features and advantages of the invention will become more apparent from the following description of a preferred embodiment thereof and from the drawing which shows a cross-sectional view of a gyroscope float assembly incorporating my invention.

The invention encompasses operating a gyroscope in a sealed float assembly which is provided with a hydrogen atmosphere having an oxygen concentration below 0.03 part per million. Means are provided within the float to catalyze the combination of hydrogen and oxygen to form water and with means to remove the water thus formed.

Reference is now made to the drawing in which there is shown a cylindrical gyroscope float 10 within which a gyroscope support shaft 12 is secured. A gyroscope motor member 14 is nonrotatably secured to shaft 12. Two ball bearing assemblies 16 and 18 rotatably support gyroscope rotor member 20 on the shaft 12. The inner surface of the float 10 has an evaporated coating 22 of palladium thereon to catalyze the combination of hydrogen and oxygen at normal temperatures and pressures. This coating can be of any material which will catalyze the normal temperature and pressure combination of hydrogen and oxygen, such as a coating of palladium black or a porous ceramic coating impregnated with either a chemically active form of palladium (i.e. active palladium) or palladium black. Two pellets 24 and 26 of a desiccant such as sodium are diametrically opposed from one another on the inner wall of the float 10. Lithium, potassium or any other suitable desiccant can be used. A hydrogen atmosphere (not shown) is present within the float 10. Mixtures of hydrogen and other suitable gases, such as nitrogen, helium, etc., may also be used.

While it is preferred that the catalytic coating 22 be on the inner wall of the float 10, the disposition of the catalytic material is not especially significant for operability. All or only a part of the wall can be coated. Moreover, the catalytic material may be incorporated as an element affixed to the inner wall of the float 10 or as a coating on, or as an element affixed to, any of the other parts within the float 10, as might be appropriate. Analogously, the desiccant can also be alternatively positioned in any convenient manner and location which does not interfere with the operation of the gyroscope.

In practicing the invention, the gyroscope is placed within the float assembly and the hydrogen atmosphere established therein. The float assembly is then sealed and then used in the manner in which a gyroscope float assembly is normally employed.

The specific method of replacing the air atmosphere within the float 10 with a hydrogen atmosphere having an oxygen level below about 0.03 parts per million can be varied. However, to serve as a specific example of one means by which this can be accomplished is the following description of an atmosphere replacement procedure.

This procedure is so rigidly controlled and so much more extensive in nature that a hydrogen atmosphere containing less than about .002 part per million oxygen can be attained. A more effective replacement is attained by maintaining the system at an elevated temperature during the entire replacement procedure. Hence, when convenient, I prefer to heat the system or critical parts thereof, to a temperature of about 165° F. The float in which the gyroscope is disposed is attached by means of a vacuum-type connection to an atmosphere replacement system containing an evacuating means and a source of hydrogen. The system is vacuum tight and it is obviously preferred that the hydrogen used be as oxygen-free as can be obtained. The float is evacuated to a pressure of approximately 0.01–0.1 micron of mercury and maintained at this pressure for approximately 20 to 24 hours. The float is then backfilled with the light gas to a pressure of from about 0.5–1 atmosphere. The float is then re-evacuated to a pressure of approximately 0.01–0.1 micron of mercury and held there for about one hour. The float is then refilled with the light gas to a pressure of 0.5–1 atmosphere and evacuated again to a pressure of about 0.01–0.1 micron of mercury, where it is maintained for about one hour. The float is again backfilled with the light gas to a pressure of about 0.1–1 atmosphere. That quantity of atmosphere in the float is then exposed to oxygen getters for approximately 50 to 80 hours. The exposure of the atmosphere to the oxygen getter can be accomplished by circulating the atmosphere over sodium, potassium or the like, in and out of the float, or any other convenient manner. Contact with the getter is then terminated and the float assembly is sealed.

It appears that there is ordinarily a small percent of residual oxygen in the light gas environments gyroscopes customarily are operated in. However, this small percent is sufficient to detrimentally react with the oil lubricating the rolling element bearing assemblies supporting the gyroscope. Eventually an oil oxidation product is formed in sufficient quantity on the assembly to result in erratic momentary changes in rotor axis disposition of greater magnitude than the original drift inherent in the gyroscope when made, i.e., jogs. Therefore, the net result is a lesser sensitivity in the gyroscope. Once the oil degradation products form sufficiently, the jogs become large enough to reduce the sensitivity of the gyroscope beyond tolerable limits of its system. Reducing the concentration of the oxygen to less than about .002 part per million and maintaining it at this level, in effect, reduces the rate of lubricant oxidation to a point where it is no longer an existing problem.

Lubricant degradation product buildup on the bearings can also be curtailed by limiting the volume of oxygen which is available for contact with the bearing assembly. This volume must be less than that which is sufficient to form enough of the oil oxidation product to deleteriously alter gyroscope performance. The oxygen volume is reduced if the total atmosphere volume is reduced. The total atmosphere volume can be reduced in various ways. The gyroscope enclosure can be made smaller, its configuration can be changed to have a lesser interior volume, etc. This may be somewhat meaningful with higher oxygen concentrations, for example, about 0.03 part per million. However, with lower oxygen concentrations, the variation in atmosphere quantity is of correspondingly lesser significance. At 0.002 part per million of oxygen, variation in overall atmosphere volume has little or no effect.

Analogously, the volume of lubricant can be reduced. However, it apparently takes only a very small amount of lubricant to form enough oxidation product to produce a jog. This prevails even in the gyroscope rolling element bearing assemblies where the amount of lubricant within the float is generally quite small. Only enough lubricant is applied to each gyroscope ball bearing assembly as will adhere to it at operating speed. Each of the gyroscopes for the Titan missile guidance system, for example, has two ball bearing assemblies supporting it. Each bearing assembly is lubricated with about 1.5 to 4 milligrams of lubricant. This is typical of many gyroscopes presently in use for inertial guidance systems. However, only 2% to 5% of this amount of lubricant is actually used in the working part of the bearings. For the higher oxygen concentrations, the total amount of oxygen is preferably not more than 5%, by weight, of the smallest amount of lubricant actually used. This amount of oxygen preferably should not be available at a rate greater than the preferred total amount of oxygen divided by ten times the desired bearing life. For the Titan 2FBG (Floated Beryllium Gyro) bearing, this amounts to 0.001 cc. of oxygen at standard temperature and pressure. Of course, if the oxygen level can be maintained at lower concentrations, especially at about 0.002 part per million, or below, variation in the total volume of oxygen produces negligible effects.

It is significant that by controlling oxygen level, or pressure in an absolute sense, life of the gyro bearing can be increased, regardless of size of the bearing, quantity of oxygen, quantity of lubricant or the like. One merely reduces and maintains the oxygen concentration to below about .002 part per million. The rate of oxygen degradation of the lubricant is diminished to such an extent that regardless of what quantity of atmosphere is used, an improvement is certain to be obtained. The extent of the improvement, of course, can be affected by atmosphere volume, in some instances, but the effect is merely to limit the extent of the improvement. Accordingly, in order to insure maximum benefit is attained by the invention, I prefer to maintain the concentration below .002 part per million in an atmosphere volume which does not contain more than about 0.5% of the actual weight of lubricant used in weight of oxygen at standard temperature and pressure.

It is to be understood that although this invention has been described in connection with certain specific examples thereof, no limitation is intended thereby except as defined in the appended claims.

I claim:

1. A gyroscope float comprising a sealed container, a gyroscope in said container, bearing means supporting said gyroscope in said container, a substantially oxygen-free atmosphere containing hydrogen in said container, a catalytic means in said container for inducing a chemical reaction between hydrogen and oxygen to form water, and means in said container for absorbing said water.

2. A gyroscope float assembly comprising a sealed gyroscope float, a gyroscope in said float rotatably supported by at least one rolling contact bearing element, a substantially oxygen-free hydrogen atmosphere in said float, said atmosphere having an oxygen concentration less than about 0.03 part per million, a palladium coating on the inner walls of said float for catalyzing a chemical reaction between hydrogen and oxygen to form water, and an alkali metal desiccant in said float for absorbing said water.

3. A gyroscope float comprising a sealed container, a gyroscope in said container, bearing means supporting said gyroscope in said container, a substantially oxygen-free atmosphere containing hydrogen in said container, said atmosphere having an oxygen concentration below about 0.002 part per million, a catalytic means in said container for inducing a chemical reaction between hydrogen and oxygen to form water, and means in said container for absorbing said water.

4. The method of making a gyroscope assembly which comprises rotatably supporting a gyroscope within an enclosure, providing a substantially oxygen-free atmosphere containing hydrogen in said enclosure, providing in said enclosure a catalytic means for promoting the chemical combination of hydrogen and oxygen to form water, providing in said enclosure a desiccant to remove water from said atmosphere, and sealing said enclosure.

5. The method of making a gyroscope assembly which comprises rotatably supporting a gyroscope within an enclosure, providing a substantially hydrogen atmosphere having an oxygen concentration less than about 0.002 part per million in said enclosure, providing in said enclosure a catalytic means for promoting the chemical combination of hydrogen and oxygen to form water, providing in said enclosure a desiccant for said water, and sealing said enclosure.

References Cited

UNITED STATES PATENTS 2,582,885   1/1952   Rosenblatt _____ 23—2.1

OTHER REFERENCES

"The Behavior of Lubricated Ball Bearings in Controlled Atmospheres," W. A. Glaeser, Lubrication Engineering, February 1960, pp. 56–60.

MILTON KAUFMAN, Primary Examiner.

PALMER W. SULLIVAN, Examiner.